United States Patent [19]

Negi et al.

[11] 4,086,474
[45] Apr. 25, 1978

[54] MULTIPLICATION TECHNIQUE IN A DATA PROCESSING SYSTEM

[75] Inventors: Virendra S. Negi, Pepperell; Ming T. Miu, Chelmsford, both of Mass.

[73] Assignee: Honeywell Information Systems Inc., Waltham, Mass.

[21] Appl. No.: 728,093

[22] Filed: Sep. 30, 1976

[51] Int. Cl.² .................................................. G06F 7/54
[52] U.S. Cl. .................................................... 364/757
[58] Field of Search ......................................... 235/164

[56] References Cited
U.S. PATENT DOCUMENTS

| | | | |
|---|---|---|---|
| 3,627,999 | 12/1971 | Iverson | 235/164 |
| 3,691,359 | 9/1972 | Dell et al. | 235/164 |
| 3,805,043 | 4/1974 | Clary | 235/164 |
| 3,816,732 | 6/1974 | Jackson | 235/164 X |

*Primary Examiner*—Jerry Smith
*Attorney, Agent, or Firm*—John S. Solakian; Nicholas Prasinos; Ronald T. Reiling

[57] ABSTRACT

Two numbers are multiplied together without first changing either of them, if negative, to a positive number, thereby minimizing the time required in the multiplication process. In the multiplication, depending upon the sign of the multiplier and the sign of a bit in a predetermined bit location of the multiplier as shifted in a shift register, the multiplier and the multiplicand are operated on by either a shift operation or operated on by a shift and add operation.

20 Claims, 10 Drawing Figures

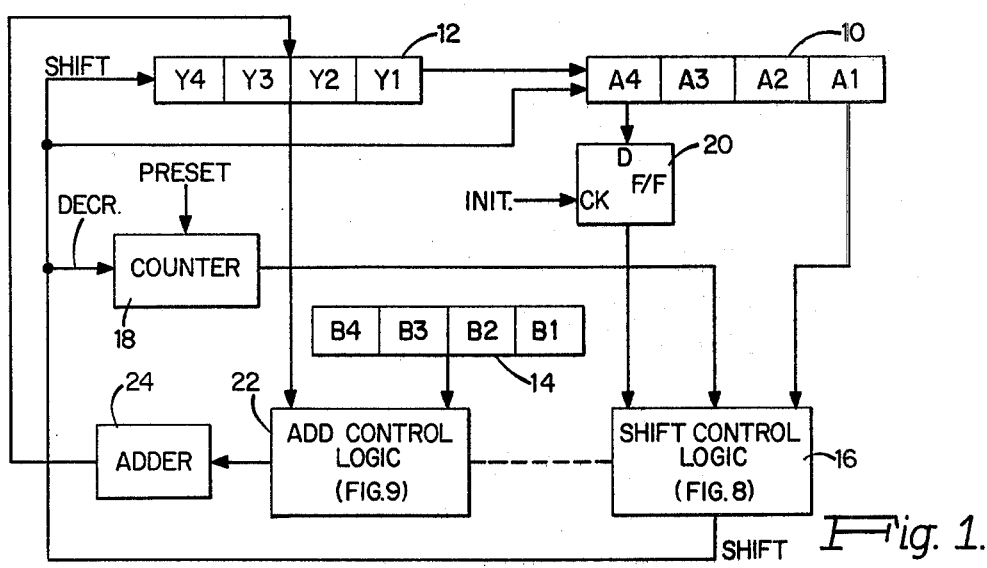
Fig. 1.
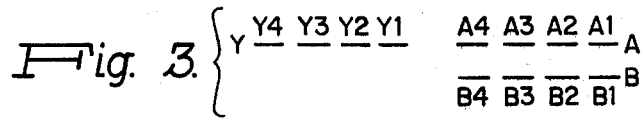
Fig. 3.
Fig. 4.
(+5X+6)
(1) Y 0 0 0 0    0 1 0 1 A
(2)              0 1 1 0 B
(3) Y 0 1 1 0    0 0 1 0 A
(4) Y 0 0 1 1    0 0 0 1 A
(5) Y 0 1 1 1    1 0 0 0 A
(6) Y 0 0 1 1    1 1 0 0 A
(7) Y 0 0 0 1    1 1 1 0 A
Fig. 5.
(+5X−6)
(1) Y 0 0 0 0    0 1 0 1 A
(2)              1 0 1 0 B
(3) Y 1 0 1 0    0 0 1 0 A
(4) Y 1 1 0 1    0 0 0 1 A
(5) Y 1 0 0 0    1 0 0 0 A
(6) Y 1 1 0 0    0 1 0 0 A
(7) Y 1 1 1 0    0 0 1 0 A
Fig. 6.
(−5X+6)
(1) Y 0 0 0 0    1 0 1 1 A
(2)              0 1 1 0 B
(3) Y 0 1 1 0    0 1 0 1 A
(4) Y 0 0 1 1    0 0 1 0 A
(5) Y 0 1 1 1    1 0 0 1 A
(6) Y 0 0 1 1    1 1 0 0 A
(7) Y 0 0 0 1    1 1 1 0 A
(8) Y 1 1 1 0    0 0 1 0 A
Fig. 7.
(−5X−6)
(1) Y 0 0 0 0    1 0 1 1 A
(2)              1 0 1 0 B
(3) Y 1 0 1 0    0 1 0 1 A
(4) Y 1 1 0 1    0 0 1 0 A
(5) Y 1 0 0 0    1 0 0 1 A
(6) Y 1 1 0 0    0 1 0 0 A
(7) Y 1 1 1 0    0 0 1 0 A
(8) Y 0 0 0 1    1 1 1 0 A

MULTIPLICATION TECHNIQUE IN A DATA PROCESSING SYSTEM

BACKGROUND OF THE INVENTION

The present invention relates generally to data processing systems and more particularly to a technique by which two numbers are multiplied in such system.

Numerous techniques for multiplying two numbers are known in the prior art. Some such techniques are discussed in the book entitled "Digital Computer Design Fundamentals" by Y. Chu, published by McGraw-Hill Book Company, Inc., 1962. Two United States patents illustrating multiplication apparatus are U.S. Pat. No. 3,551,663 issued on Dec. 29, 1970 and U.S. Pat. No. 3,641,331 issued on Feb. 8, 1972. Each of these multiplication techniques of the prior art have certain advantages and disadvantages. For example, some such techniques require a rather large amount of logic in order to decrease the time of the multiplication process, and on the other hand some such techniques although requiring minimal logic take an extensive period of time to provide the result of the multiplication. Accordingly, it is important in most cases that a balance be achieved between the cost and space required for additional logic circuitry and the time required to perform such multiplication. An additional consideration in the multiplication process is the sign of the multiplier and the multiplicand. Some such multiplication techniques require special treatment for a negative signed number. For example, in some such techniques, the negative number must first be converted to a positive number via for example taking the so-called twos complement of such number. For two negative numbers, to be multiplied, then both such numbers must be converted to positive numbers. Obviously, the requirement to initialize the numbers to be multiplied based on their sign requires additional time and accordingly in some cases is not tolerable.

It is accordingly a primary object of the present invention to provide a multiplication technique in a data processing system which improves and which minimizes the time for the multiplication process particularly with respect to negative numbers.

SUMMARY OF THE INVENTION

The above stated objects are achieved according to the present invention by providing multiplication apparatus for multiplying a first number times a second number, and including a first register for storing the first number, a second register and apparatus for coupling the first and second register so as to enable shifting operations therebetween. Apparatus is further provided which is responsive to a predetermined condition of the contents of the first register for loading the second number into the second register. Apparatus for shifting the contents of the second register into the first register and accordingly shifting the contents of the first register is further provided. Also provided is apparatus for adding the magnitude of the second number to a predetermined portion of the contents of the second register and loading the sign of the second number into the most significant bit position of the second register. Further apparatus is provided for detecting the state in a predetermined bit position of the first register and in response to the sign of the first number, enabling the apparatus for shifting and the apparatus for loading the sign of the second number into the second register; or enabling such apparatus for shifting, enabling the apparatus for loading and the apparatus for adding. Thus depending upon the state of such bit in the predetermined bit position of the first register, there is either a shift and load operation or a shift, load and add operation. These operations are performed a total number of times related to the number of bits in the first number following which the result of the multiplication process may be derived from the contents of the first and second registers.

BRIEF DESCRIPTION OF THE DRAWINGS

The above and other objects of the present invention are achieved in the illustrative embodiment as described with respect to the figures in which:

FIG. 1 illustrates the apparatus of the present invention;

FIG. 3 represents the format of first, second and third registers which may be utilized in the apparatus of the present invention;

FIGS. 4–7 illustrate state diagrams of the contents of such three registers during the multiplication process of the present invention;

DETAILED DESCRIPTION OF THE PREFERRED EMBODIMENTS

Figure 2:
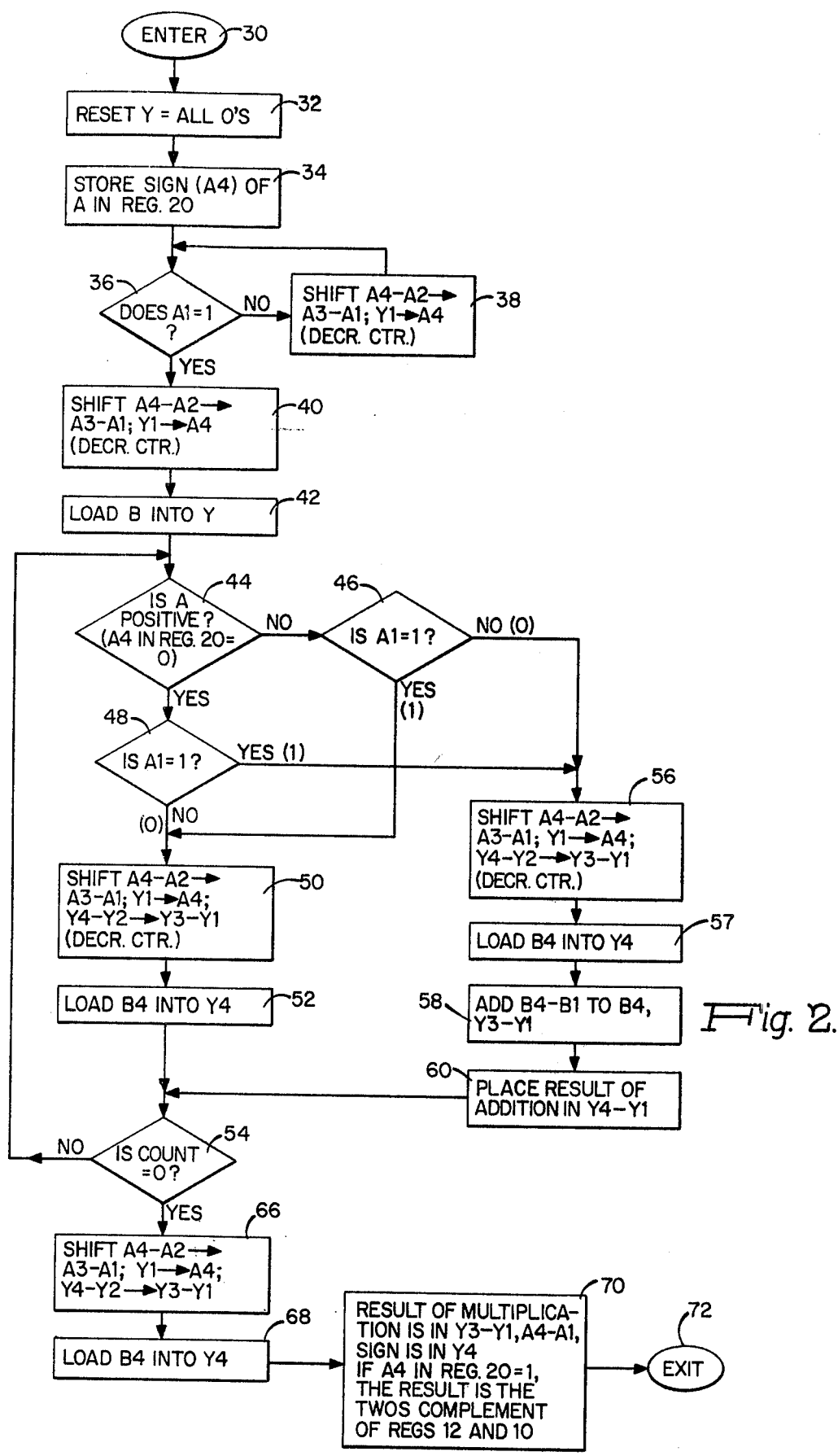
FIG. 2 illustrates a flow diagram of the operation of the apparatus of the present invention.

Now referring to FIG. 1, there is shown a block diagram of the apparatus of the present invention. There is a first shift register 10 and a second shift register 12. Further, there is included a storage register 14. By way of example, each of such registers are shown to include four bit locations. This was done for ease in illustrating the operation of the present invention. As can be seen, such registers may be expanded to include for example 16 or more bit locations without departing from the scope of the present invention. Each of such registers includes a most significant bit position A4, B4 and Y4 respectively and a least significant bit position A1, B1 and Y1 respectively. The least significant bit position of register 12 is coupled to the most significant bit position of register 10. It can be readily seen that registers 10 and 12 may have been in fact one shift register having, by the illustrated example, eight positions. Each of such registers 10 and 12 are coupled for shifting the contents thereof bit by bit from left to right in accordance with the shift output signal provided via shift control logic 16. Shift control logic 16, which is shown in more detail in FIG. 8, receives its control signals from the least significant bit position A1 of register 10, from counter 18 and from the sign of the first number via register or flip-flop 20.

Counter 18 is preset typically to the number of bit locations in register 10 and may be preset to a number which is no more than the number of bits in the multiplier. When the counter is decremented to zero, this partially disables logic 16. At this point in time, the apparatus of the present invention has performed the entire multiplication sequence and the result thereof will be found in registers 12 and 10.

Figure 8:
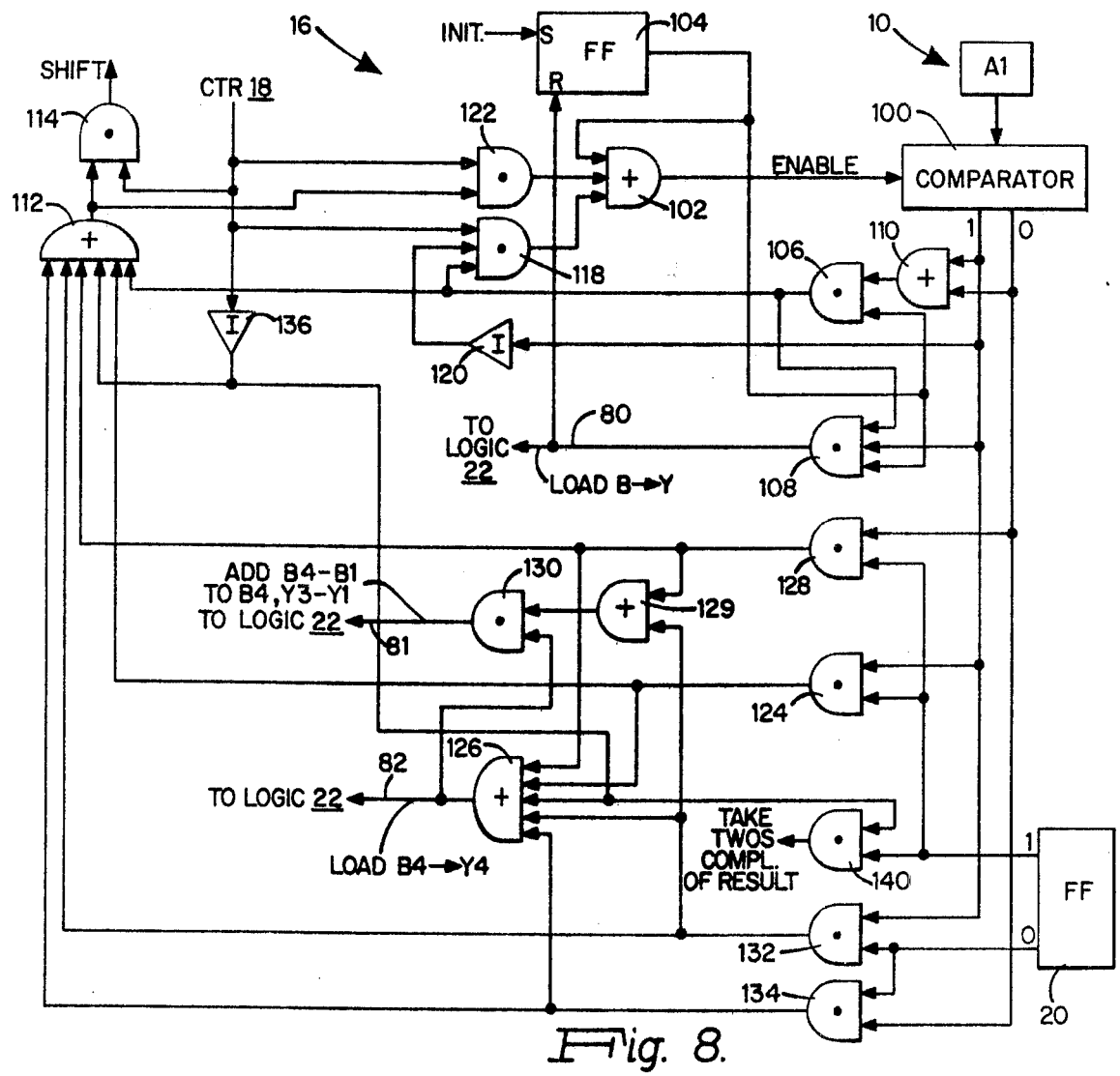
FIGS. 8 and 9 illustrate gate logic which may be utilized in the apparatus of the invention as illustrated in FIG. 1.
Figure 9:
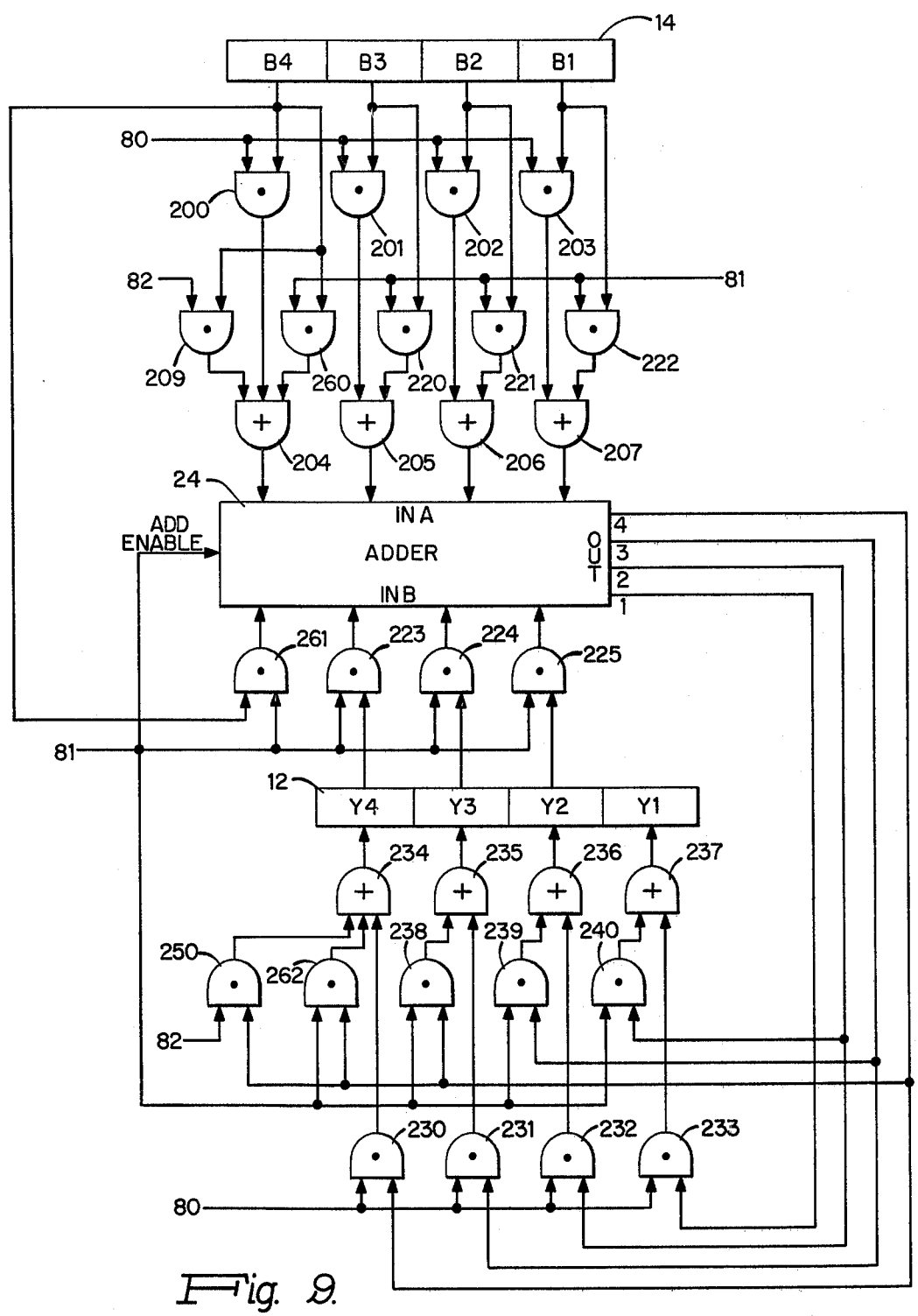

Add control logic 22, as shown in detail in FIG. 9, is coupled to add the contents or a portion thereof of register 12 and the contents or a portion thereof of register 14 via adder 24. Logic 22 is also coupled to simply pass the sign of the multiplicand or second number in register 14, the sign of which is located in the most significant bit location B4, to the most significant bit location Y4 of register 12. The typical add operation to be performed will add the bits B4, B3, B2 and B1 to bits B4, Y4, Y3 and Y2 with the result thereof placed in locations Y4, Y3, Y2 and Y1 respectively. Shift control logic 16 is coupled with add control logic 22 by several control lines as specifically illustrated in FIGS. 8 and 9 and as shown by the dotted line of FIG. 1. The operation of the apparatus of FIG. 1 is best illustrated by the flow diagram of FIG. 2. Examples illustrating the operation of such apparatus for the multiplication of two numbers five times six in the four different sign combinations are shown in FIGS. 4–7 which are self-illustrating when taken together with the format of such figures as illustrated in FIG. 3. In FIGS. 4–7 it is shown that in line 2 of each of such figures that the contents of B register 14 remains the same during each such operation and accordingly is only indicated once, whereas the contents of registers 10 and 12 change in accordance with the operation in the present invention. The magnitude of the result is indicated by a rectangle in the last line of each of such figures, with the sign being the left most bit outside the rectangle. The details of logic 16 and 22 are discussed hereinafter.

Now referring to FIG. 2, the multiplication technique of the present invention is entered at block 30. Initially, the Y register 12 is reset to include all binary ZEROs as indicated in block 32. Further, initially, the sign of the first number as indicated in position A4 of register 10 is clocked into the register of flip-flop 20 as indicated in block 34. Initial conditions are that the register 10 and register 14 respectively have stored therein the first and second numbers and following the operation indicated by blocks 32 and 34, the sign of the first number is stored in register 20 and each of the bits of register 12 is equal to a binary ZERO.

As indicated hereinbefore, the operation of the present invention is dependent upon the sign of the first number as well as the binary state of a predetermined position in register 10 which is shown to be the least significant position A1 of register 10. It can be seen that position A1 may be used initially to indicate such binary state but that thereafter in order to increase the speed of the apparatus of the present invention, position A2 may have been utilized to indicate the binary state. For initial conditions, the apparatus of the present invention independent of the sign of the first number in register 10, determines whether a binary ONE state is in position A1. If there is a binary ZERO in position A1, then at least the contents of register 10 are shifted right one position until a binary ONE is found in position A1. These shifts, as well as the shifts to be described hereinafter, will cause counter 18 to decrement and accordingly such shifts, the number of which by way of example are equal to the number of positions in register 10, are counted in determining when in fact the result of the multiplication will be stored in registers 12 and 10. Thus, if initially there is a binary ZERO in positions A1 and A2 and a binary ONE in position A3, then there will be two such shifts without any other operation until the binary ONE is found as shifted from position A3. It will be noted that position A4 includes the sign of the first number. By way of example, if the bit in position A4 is a binary ONE, then the number is negative and if the bit in position A4 is a binary ZERO, then the number is positive.

Thus, in block 36 of FIG. 2, a determination is made as to whether or not the bit in position A1 is a binary ONE. If the answer is No, block 38 is entered by which at least the bits in register 10 are shifted right and the binary ZERO state in location Y1 of register 12 is shifted into location A4 of register 10. However, it can be seen that as illustrated hereinafter, the implementation of the apparatus of the present invention is simplified by simply shifting the entire contents of registers 12 and 10 toward the least significant bit position thereby accomplishing the same result. In addition, as indicated hereinbefore, each time there is a shift, counter 18 is decremented. At this point the question is asked in block 36 whether the bit in position A1 is a binary ONE. If the answer is Yes, then block 40 is entered by which the operation of block 38 is repeated provided however that thereafter block 42 by which the contents of the B register 14 are loaded into the Y register 12. This is accomplished via control logic 22 and adder 24. It can be seen that the loading of the entire contents of the register 14 into the register 12 may have been accomplished without an adder by simply providing gating structure enabled by the indication of a binary ONE in position A1 and in response to the shift operation provided in block 40. Thus at this point, the contents of register 10 have been shifted at least once and the left most position thereof includes at least one binary ZERO state from register 12 and in addition, the contents of register 14 have been loaded into the contents of register 12. It can be seen that a further question may have been posed at the output side of block 38, namely, has the counter 18 counted down to a binary ZERO. If the answer was No, then block 36 would be reeentered, however, if the answer was Yes, it can be seen that the result would be zero and the process may exit at this point.

Following the operation of block 42, block 44 is entered and a previous determination made as to whether or not the first number A which was in register 10 is a positive number is indicated by a binary ZERO state in flip-flop 20. Depending upon the answer to block 44, then either one of two sequences is initiated, both such sequences initiated by again determining the binary state of the bit in position A1 of register 10 as indicated in blocks 46 and 48.

In summary of the operations following the determinations made in blocks 46 and 48, if the first number A is positive as indicated by flip-flop 20, then if the binary state of bit position A1 of register 10 is a binary ZERO, the shift operation described with respect to blocks 38 and 40 as well as a complete shift of the contents of register 12, and a loading of the sign of the second number as indicated in position B4 of register 14 into position Y4 of register 12 takes place. If the first number A is a positive number, and the state of the bit in position A1 of register 10 is a binary ONE, there will not only be such shift and load operation, but there will also be an add operation of the contents of the B register 14 with B4 and bit positions Y4, Y3 and Y2 of Y register 12 following which the result is placed in register 12. If, in fact, the first number A in register 10 was initially a negative number as indicated by flip-flop 20, then, in fact, the operation will be the same as just indicated except that the shift and load sign operation will be responsive to a binary ONE state in position A1 of register 10 and the shift, load and add operation will be responsive to binary ZERO state in position A1.

Now in more detail, the first example to be taken is that A is a positive number. At this point, block 48 is entered and if the bit position A1 of register 10 indicates a binary ZERO, and accordingly the answer to block 48 is a No answer, then block 50 will be entered during which time a shift operation will be performed except that in this case it is mandatory that the entire shift which as a practical matter is provided for blocks 38 and 40 is provided by which the bit positions A4 through A2 are shifted right into positions A3 to A1; bit Y1 is transferred into bit position A4; and bits Y4 to Y2 are transferred into positions Y3 to Y1. In addition, the counter 18 is decremented. Further, following the shift operation, the bit state in position Y4 of register 12 has loaded therein the sign of the second number B in register 14 as indicated in block 52. At this point, a determination is made by block 59 as to whether or not the count of counter 18 is equal to zero. If the answer is No, then block 44 is reentered. If the answer is Yes, then block 66 is entered.

If the answer to block 48 was a Yes, i.e., that the binary state of the bit in position A1 is a binary ONE, then block 56 will be entered. Block 56 contains the same operation as provided in block 50. The add control logic 22 as discussed with respect to FIG. 9 assumes that the entire contents of register 12, as well as register 10, have been shifted. Block 56 is then entered at which time the sign of the second number in position B4 is loaded into position Y4 of register 12, as was the case in block 52. Following this, block 58 is then entered at which time the following operation takes place. The contents of register 14 are essentially added to B4 and a portion of the contents of register 12. More particularly the contents of bit positions B4, B3, B2 and B1 of register 14 are added to the contents of bit positions B4, Y3, Y2 and Y1 following which, as generally indicated in block 60, the result thereof is placed in positions Y4, Y3, Y2 and Y1 respectively of register 12. At the conclusion of the operation provided by block 60, block 54 is entered by which a determination is made as to whether or not counter 18 includes a count equal to zero, and if the answer is No, then block 44 is again entered. If the answer is Yes, then block 66 is entered.

If the first number A is a negative number as indicated by a No answer in block 44, then block 46 would have been entered. Again a determination is made for block 46 as to whether or not the state of bit position A1 of register 10 is a binary ONE or a binary ZERO. If the state in position A1 is a binary ONE, then a Yes answer will result and block 50 will be entered by which the shift and then the load sign operation of block 52 is provided. The question then is again asked as to whether or not the count of counter 18 is equal to zero. If a No answer results, then block 44 is again entered. Actually, block 44 is not an operation but rather a response to an indication of the state of flip-flop 20 which is set to enable the proper logic in either logic 16 or logic 22 so as to provide the proper operation. If the first number A in register 10 was negative and block 46 was entered with the indication in position A1 being in binary ZERO, i.e., a No answer, then block 56 is entered by which the shift operation, load result and add operation will be performed as indicated in blocks 56, 57, 58 and 60, following which block 54 is entered, and if the operation is not complete, block 44 is again entered. It can be seen that a determination may have been made at the output side of block 42 as to whether or not the counter has been decremented to zero by the operations of blocks 38 and 40 and to enter block 66 directly if such a determination is made without entering block 44. Such a condition may occur for example if a 1000-bit pattern was initially (the first number) in register 10.

Once the counter 18 is equal to zero, this indicates that the number of total shifts performed is equal to no less than the number of bits in the first number or if one does not desire to utilize the additional logic required to determine the number of bits in the first number, then the count is equal to zero after the total number of shifts is equal to the number of bit locations in register 10. As a result of a Yes answer from block 54, block 66 is entered by which the shift operation, as indicated in block 50, is again repeated so as to provide the magnitude of the result in positions Y3 through Y1 and A4 through A1 of registers 12 and 10 respectively. Following this, block 68 is entered by which the sign of the second number is loaded into position Y4 of register 12. Accordingly, block 70 is entered and it can be seen that the result of the multiplication is found in registers 12 and 10. The sign is in position Y4 of register 12, with the most significant bit of the magnitude of the result being in position Y3 of register 12 and the least significant bit being in position A1 of register 10. The result needs no further processing, if, in fact, the first number A originally loaded into register 10 was a positive number. If, however, the first number A loaded into register 10 was a negative number, then the actual and usable result of registers 12 and 10 will be the so-called twos complement of the contents including sign and magnitude of the values stored in registers 12 and 10. The twos complement of a number and apparatus to perform same is well-known in the art. A handy rule for negating positive or negative numbers in twos complement representation is to start at the right and keep all trailing binary ZEROs and the first binary ONE reached, and from the next digit on, interchange the binary ONEs and ZEROs. Accordingly, with the result in registers 12 and 10, the multiplication technique is exited at block 72.

Now referring to FIG. 8, the shift control logic 16 is shown. Bit position A1 of register 10 is shown coupled to the input of a comparator 100 which is enabled by the output of OR gate 102. Under initial conditions, flip-flop 104 is set and will enable comparator 100 via OR gate 102 and will also enable gate 106 and partially enable gate 108. The output of comparator 100 is coupled to several inputs among which include OR gate 110 which is coupled to generate a signal at its output fully enabling AND gate 106 when under initial conditions either a binary ONE or binary ZERO is detected by comparator 100 in bit position A1 of register 10. Under either of these conditions, a shift signal will be provided via OR gate 112 and AND gate 114 which is enabled unless counter 18 has counted down to zero. An extra shift is also provided however as indicated in block 66 of FIG. 2 after the count of counter 18 is equal to zero.

At the same time that gate 106 is fully enabled, gate 108 will be fully enabled if in fact a binary ONE was detected by comparator 100. In response to such binary ONE state detected on the first comparison, the flip-flop 104 will be reset and accordingly will inhibit any further enabling of gate 106 or gate 108. In addition, the binary ONE state initially detected by comparator 100 via inverter 120 will disable gate 118 from enabling comparator 100. The operation just described will be repeated if a binary ZERO is detected by comparator 100. Further, the output of gate 108 is coupled to add control logic 22 so as to command by means of the signal on line 80 the loading of the entire contents of register 14 into the Y register 12 as indicated in block 42 of FIG. 2. Thus the operation through block 42 of FIG. 2 for the shift control logic 16 has been shown.

For each shift after such initial operations have been made, and so long as counter 18 has not counted down to zero, AND gate 122 is enabled so as to via OR gate 102 enable comparator 100 to determine whether a binary ONE or a binary ZERO is in position A1 of register 10. If flip-flop 20 indicates a binary ONE state at its output indicating that the first number A is negative, then if in fact there is a binary ONE state in position A1 of register 10, AND gate 124 will be fully enabled so as to cause the shift operation, and in response to the enabling of gate 124, OR gate 126 is coupled to provide the loading of B4 into Y4 by means of a signal on line 82. This signal is provided to logic 22 so as to provide the operation of blocks 52 and 57. If the first number A is a negative number and on the other hand the bit in position A1 is a binary ZERO, then AND gate 128 will be fully enabled causing the shift as indicated in block 56 of FIG. 2, and in response thereto via OR gate 126 enabling the loading of B4 and Y4 by means of a signal on line 82. In response to this, AND gate 130 enables the adding of B4–B1 to B4, Y3–Y1 in response to the signals received at OR gate 129. The enabling of such adding is provided by a signal on line 82. Also, as indicated in block 60, the add control logic 22 places the result of the addition in the Y register. This explains the operation when the first number is negative and either a binary ONE or a binary ZERO is indicated by comparator 100. It is noted that lines 80, 81 and 82 are the control lines represented by the dotted line in FIG. 1.

When the first number A is a positive number, as indicated by a binary ZERO at the output of flip-flop 20, if comparator 100 indicates a binary ONE state in position A1 of register 10, then AND gate 132 is fully enabled causing the shift signal to occur at the output of AND gate 114. Further, the signal at the output of gate 132 causes via OR gate 126 the load B4 into Y4 operation to take place following which B4–B1 are added to B4, Y3–Y1, by the enabling of AND gate 130. Following this, the result is placed in the contents of the Y register 12. If, on the other hand, when the first number A is a positive number and a binary ZERO state is indicated by comparator 100, then AND gate 134 is fully enabled thereby enabling the shift operation, as indicated in block 50 of FIG. 2 and further via OR gate 126, the contents of position B4 is loaded into position Y4. This thus describes the operation when the first number is a positive number and either a binary ONE or a binary ZERO is detected by comparator 100.

When counter 20 has finally counted down to a zero state, the shift operation of block 66 is enabled via inverter 120 following which a load operation is provided as indicated in block 68 of FIG. 2. This is accomplished since the binary ONE state normally provided by counter 20 changes to the binary ZERO state when the count equals zero at which time a binary ZERO is at the input of inverter 136 and a binary ONE state at the output thereof thereby enabling the shift operation via OR gate 112. This also enables the loading of the contents of position B4 into position Y4 via logic 22 in response the signal provided via OR gate 126 on line 82.

Following this operation, the result of the multiplication is in registers 12 and 10. If, in fact, the sign indicated in flip-flop 20 is negative, the result is the twos complement of the contents of registers 12 and 10. The taking of the twos complement is well-known in the art and the enabling of AND gate 140 causes such well known twos complement operation to take place with the result thereof placed either in registers 12 and 10 or in another storage device as may be desired. The add control logic 22 is shown in FIG. 9. Register 14 is shown coupled to a plurality of gates as in register 12. Register 12 is also shown to receive the output of adder 24 via a plurality of gates. For the load of the contents of B into the contents of Y operation, the signal on line 80 is activated thereby fully enabling gates 200, 201, 202 and 203 to pass the contents of register 14 via OR gates 204, 205, 206 and 207 to the A input of adder 24. The value of the A input is coupled to be transferred into the Y register 12 via AND gates 230, 231, 232 and 233, and OR gates 234, 235, 236 and 237. Such value received at the A input of adder 24 is not changed unless the add enable signal on line 81 is activated. For the load B4 into Y4 operation, the signal on line 82 is activated thereby enabling the binary state in position B4 of register 14 to be passed through AND gate 209, OR gate 204, adder 24, AND gate 250, and OR gate 234, into position Y4 of register 12. For the add B4–B1 to B4, Y3–Y1 operation, it is noted that the result thereof is placed in positions Y4, Y3, Y2 and Y1 respectively. It is also noted as indicated hereinbefore, that the assumption was made that the entire contents of registers 12 and 10 were shifted in block 56. Accordingly, then following such complete shift, and the load sign operation of block 57, block 58 operates to add B4–B1 to B4, Y3–Y1. In response to the indication for such add operation, the signal on line 81 fully enables AND gates 260, 220, 221 and 222 so that via OR gates 204, 205, 206 and 207, the contents of positions B4, B3, B2 and B1 are provided to the A input of adder 24. At the same time, the contents of positions B4, Y4, Y3 and Y2 are enabled via AND gates 261, 223, 224 and 225 to the B input of adder 24. The result on the output lines of adder 24 is provided via AND gates 262, 238, 239 and 240 and via OR gates 234, 235, 236 and 237 into the positions Y4, Y3, Y2 and Y1 of register 12.

Figure 10:
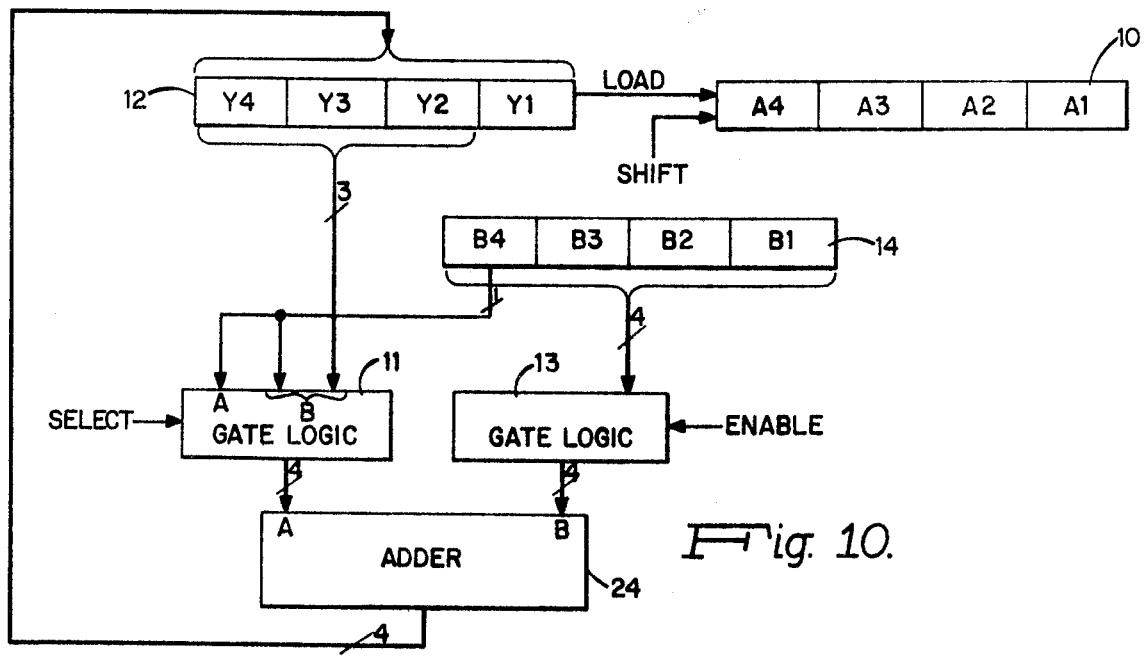
FIG. 10 a further embodiment of the apparatus of the present invention.

It can be seen that various changes may be made to the apparatus of the present invention without departing from the scope thereof. It has already been seen for example that registers 12 and 10 may have been a single register. It can be further seen that the gate logic of FIGS. 8 and 9 may be implemented in many different ways without departing from the scope of the present invention. Further, the apparatus of the present invention may have been implemented in part by use of a micrprogrammed computer without departing from the scope of the present invention. For example, the gating, transferring, loading and adding operations have been implemented in part by the applicant by use of such a computer. Further, the apparatus may have been implemented as generally shown in FIG. 10. Only registers 10, 12, 14, adder 24, as well as gate logic 11 and 13, are shown. Counter 18 as well as flip-flop 20 and the coupling of position A1 of register 10 would generally remain as previously shown. Gate logic 11 is shown to couple via inputs A and B thereof, either B4 for loading into Y4 or B4, Y4, Y3 and Y2 for adding to B4–B1 in reponse to a select signal as may be generated for example on lines 81 and 82 of the embodiment of FIG. 8. The other gate logic 13 is coupled to provide the entire contents of register 14 to the B input of adder 24 for adding to the value provided at the A input of adder 24 via the B input of logic 11 in response to an enable signal as may be generated on line 81 or to simply transfer the entire contents of B register 14 into Y register 12 in response to a Load B into Y signal such as on line 80 of FIG. 8. Additionally, as shown in FIG. 10, only the contents of register 10 need be shifted with the contents of position Y1 copied or loaded, without changing the contents of position Y1, into position A4 of register 10. The remainder of the shift operation in such case would be provided by means of adder 24.

Having described the invention, what is claimed as new and novel and for which it is desired to secure Letters Patent is:

1. Apparatus for multiplying a first number times a second number comprising:
   A. a first register for storing said first number, said first register having a predetermined bit position;
   B. a second register;
   C. means for shifting by bit the contents of said first register and said second register with the contents of said second register coupled to be shifted into said first register;
   D. means, responsive to a predetermined condition, for loading said second number into said second register; and
   E. enabling means, responsive to the sign of said first number and the state of a bit in said predetermined position of said first register, for either
      (1) enabling said means for shifting the contents of said second register and the contents of said first register, and loading the sign of said second number into a predetermined position of said second register, or
      (2) enabling said means for shifting the contents of said second register and the contents of said first register, loading the sign of said second number into said predetermined position of said second register, and adding said second number to the contents of said second register.

2. Apparatus as in claim 1 wherein said predetermined condition is determined by a portion of the contents of said first register independent of the sign of either said first or second number.

3. Apparatus as in claim 2 wherein said portion of the contents of said first register is said predetermined position of said first register.

4. Apparatus as in claim 3 further comprising:
   A. means, responsive to a bit of a first state in said predetermined position of said first register, for enabling said means for shifting said first number in said first register; and
   B. means, responsive to a bit of a second state in said predetermined position of said first register, for enabling said means for shifting said first number in said first register prior to loading said second number into said second register.

5. Apparatus as in claim 1 wherein said enabling means comprises:
   A. means, responsive to a positive sign of said first number and a bit of a first state in said predetermined position of said first register or responsive to a negative sign of said first number and a bit of a second state in said predetermined position of said first register, for enabling said means for shifting and loading the sign of said second number into said predetermined position of said second register; and
   B. means, responsive to a positive sign of said first number and a bit of second state in said predetermined position of said first register or responsive to a negative sign of said first number and a bit of a first state in said predetermined position of said first register, for enabling said means for shifting, loading the sign of said second number into said predetermined position of said second register, and adding said second number to the contents of said second register.

6. Apparatus as in claim 1 wherein said enabling means includes means for enabling said means for shifting a number of times no less than the number of bits in said first number following which the result of said multiplying may be found in said second and first registers.

7. Apparatus as in claim 1 wherein said enabling means includes means for enabling said means for shifting a number of times equal to the number of bit positions in said first register following which the result of said multiplying may be found in said second and first registers.

8. Apparatus as in claim 7 further comprising means, responsive to a negative sign of said first number, for generating a signal indicating that the twos complement of said result in said second and first registers should be taken in order to obtain a more usable result.

9. Apparatus for multiplying a first number times a second number comprising:
   A. a first register for storing said first number;
   B. a second register, said first and second registers each having most and least significant bit positions;
   C. means for coupling the least significant bit position of said second register with the most significant bit position of said first register;
   D. means, responsive to a predetermined condition of the contents of said first register, for loading said second number into said second register;
   E. first means, responsive to the state of a bit in a predetermined bit position of said first register and the sign of one of said numbers, for:
      (1) shifting in the direction of the most significant bit position to the least significant bit position, the contents of said first and second registers with the bit in said least significant bit position of said second register shifted into the most significant bit position of said first register, and
      (2) loading the sign of said second number into the most significant bit position of said second register;
   F. second means, responsive to the state of a bit in said predetermined bit position of said first register and the sign of said one of said numbers, for:
      (1) shifting, in the direction of the most significant bit position to the least significant bit position, the contents of said first and second registers with the bit in said least significant bit position of said second register shifted into the most significant bit position of said first register,
      (2) loading the sign of said second number into the most significant bit position of said second register, and
      (3) adding a predetermined portion of said second number to a predetermined portion of the contents of said second register; and G. means for either enabling said first means if the sign of said one of said numbers is positive and the bit in said predetermined position is in a first state or if the sign of said one of said numbers is negative and the bit in said predetermined position is in a second state or enabling said second means for any other combination of said sign and said states of the bit in said predetermined position.

10. Apparatus as in claim 9 wherein said one of said numbers is said first number.

11. Apparatus as in claim 10 wherein said means for enabling includes means for enabling said first and second means a total number of times related to the number of bits in said first number.

12. Apparatus as in claim 10 wherein said means for enabling includes means for enabling said first and second means a total number of times related to the number of bit positions in said first register.

13. Apparatus as in claim 10 wherein the result of the multiplication of said first and second numbers may be found in said second and first registers, the sign of said result being in said most significant bit position of said second register and the magnitude of said result being in the remaining positions of said registers with the lowest significant bit of said magnitude being in the lowest significant bit position of said first register.

14. Apparatus for multiplying a first number times a second number comprising:
   A. a first register for storing said first number, said first register having a predetermined bit position;
   B. a second register;
   C. means for shifting by bit the contents of said first register and said second register with the contents of said second register coupled to be shifted into said first register;
   D. first means, responsive to a predetermined condition, for loading said second number into said second register;
   E. second means for loading the sign of said second number into a predetermined position of said second register;
   F. means for adding said second number to the contents of said second register;
   G. first means for enabling said first means for loading in response to initial conditions including said predetermined condition;
   H. second means for enabling said means for shifting and enabling said second means for loading in response to either the enabling of said first means for loading, or in response to the enabling of said means for shifting and second means for loading or in response to the enabling of said means for adding; and
   I. third means for enabling said means for adding in response to said second means for enabling and the sign of said first number.

15. Apparatus as in claim 14 wherein said second and third means for enabling are responsive to the state of said bit in said predetermined bit position of said first register.

16. Apparatus as in claim 15 wherein said second means for enabling includes means for enabling said means for shifting a number of times equal to the number of bit positions in said first register following which the result of said multiplying may be found in said second and first registers.

17. A machine implemented process for multiplying a first number times a second number comprising the method steps of:
   A. loading said first number into a first shift register;
   B. loading a second number into a storage register;
   C. loading a predetermined bit pattern into a second shift register;
   D. generating a first signal if a bit of a first state is in a predetermined bit position of said first shift register or a second signal if a bit of a second state is in said predetermined position;
   E. shifting by one bit in response to either said first or second signal, the contents of said first shift register and the contents of said second shift register into said first shift register;
   F. loading, after said step of shifting and in response to said first signal, the contents of said storage register into said second shift register;
   G. repeating said step of shifting and then loading the sign of said second number into said second shift register in response to first and second combinations of said first and second signals and the sign of said first number; and
   H. repeating said step of shifting, adding a portion of the contents of said storage register to a portion of the contents of said second register, and then loading the sign of said second number into said second shift register in response to third and fourth combinations of said first and second signals and the sign of said first number.

18. A process as in claim 17 further comprising the step of enabling said step of shifting a total number of times related to the number of bit positions in said first shift register.

19. A process as in claim 18 wherein said first, second, third and fourth combinations are defined respectively as follows: positive sign and second signal; negative sign and first signal; positive sign and first signal; and negative sign and second signal.

20. A process as in claim 18 wherein the result of said multiplication is provided in said first and second shift registers.

* * * * *